United States Patent [19]

Selvatici

[11] Patent Number: 4,645,216
[45] Date of Patent: Feb. 24, 1987

[54] RADIALLY DISPOSED SEALING DEVICE FOR ROTATING MEMBERS

[76] Inventor: Franco Selvatici, Via L. Rodriguez, 4, 40068 S.Lazzaro di Savena (Bologna), Italy

[21] Appl. No.: 830,375

[22] Filed: Feb. 18, 1986

[30] Foreign Application Priority Data

Feb. 22, 1985 [IT] Italy .................................. 4780/85[U]

[51] Int. Cl.$^4$ .............................................. F16J 15/24
[52] U.S. Cl. .................................. 277/188 R; 277/165; 277/194; 277/198
[58] Field of Search ............... 277/188 R, 188 A, 165, 277/177, 178, 186, 192, 193, 194, 198, 199

[56] References Cited

U.S. PATENT DOCUMENTS

| | | | |
|---|---|---|---|
| Re. 31,171 | 3/1983 | Brent .................................. | 277/188 R |
| 2,611,671 | 9/1952 | Jirsa .................................. | 277/188 R |
| 2,898,134 | 8/1959 | Moskow .......................... | 277/188 R |
| 3,717,293 | 2/1973 | Traub et al. ................. | 277/188 R X |

Primary Examiner—Robert S. Ward
Attorney, Agent, or Firm—Reed Smith Shaw & McClay

[57] ABSTRACT

A bearing sealing device comprises a middle ring having peripheral channel adapted to partially accommodate an annular sealing means that exerts a sealing action against a rotating member to be protected, and against the inner surface of the encircling casing within which the rotating member is located, and an lower ring which, by being urged against the middle ring, insures a sound tightness by virtue of the contact of one annular surface thereof with an opposing surface of the first annular element; a spacer means insertable into the first annular element, which spacer is retained in place by the lower ring. It is provided with a lower cylindrical recess partially accommodating a second annular seal which is adapted to exert a sealing action on the central shaft on which the rotating member being protected is mounted.

5 Claims, 3 Drawing Figures

RADIALLY DISPOSED SEALING DEVICE FOR ROTATING MEMBERS

FIELD OF THE INVENTION

The present invention relates to a method and means.

BACKGROUND OF THE INVENTION

The invention relates to a radially disposed sealing device for rotating members, like toroids.

DESCRIPTION OF THE PRIOR ART

It is known that in the equipment designed to operate in environments, particularly those infiltrated by impurities such as mud, dust and the like, it is necessary to provide suitable sealing devices adapted to protect the rotating members.

For that purpose radially disposed sealing devices made of steel are currently used; they substantially consist of a group of rings defining apertures for receiving seals made of synthetic rubber.

Such sealing devices generally have substantial overall dimensions, extending in an axial direction, relative to the central shaft on which the member to be protected is mounted. As a result, they involve a relative adjustment of the housing, and in addition they cause a poor utilization of the characterizing features of the pivot itself which is then obliged to work in a more cantilevered condition.

Furthermore, existing radially positioned metallic sealing devices require the use of suitable spacers, as well as of accessories adapted to help bear lateral thrusts and stresses.

SUMMARY OF THE INVENTION

One technical goal of the present invention is to obviate the above mentioned drawbacks and to provide a radially disposed sealing device made of steel but having very reduced overall dimensions which need not include further accessories.

Within the scope of this technical goal it is a further object of the present invention to provide a sealing device preferably made of steel which is of simple construction very reliable in operation and of universal use.

The foregoing goal and objects are both achieved, according to the present invention, by a radially disposed sealing device for rotating members, essentially comprising: a middle ring adaptable to a given clearance, outwardly provided with an externally projecting shoulder, partially accommodating a first annular seal; an lower ring, adaptable to a given clearance, suitable to lie, along its upper face against the lower face of the middle ring; an annular spacer adapted to be slipped within the middle ring and to be pressed fitted between said lower ring and the rotating member to be protected, and the spacer is provided with an inwardly disposed channel adapted to partially accommodate another annular seal.

By this configuration, a very effective sealing device having a reduced overall axial dimension is achieved. This is an effective barrier to the penetration of external agents such as mud, dust and the like. It is provided by the contact between the opposing surfaces of the first (middle) and second (Lower) rings in exerting a frictional action with respect to each other.

Advantageously, the channel accommodating the first annular seal bounded by the middle ring is adjusted to a specific clearance (which is designed to be brought into contact with the rotating member to be protected, a bearing for example), is conformed in such a way that it biases the seal both against the rotating member and against the inner surface of the casing in which the rotating member sealing device assembly is mounted, thereby ensuring a double effect of the seal, that is, the first is in an axial direction and, second, is in a radial direction with respect to the rotating member to be protected.

BRIEF DESCRIPTION OF THE DRAWINGS

Further features and advantages of the invention will become apparent from the detailed description of a first and preferred embodiment of the sealing device described hereinafter, by way of non-limiting example, and with reference to the accompanying drawings), in which.

DESCRIPTION OF THE PREFERRED EMBODIMENT

Figure 1:
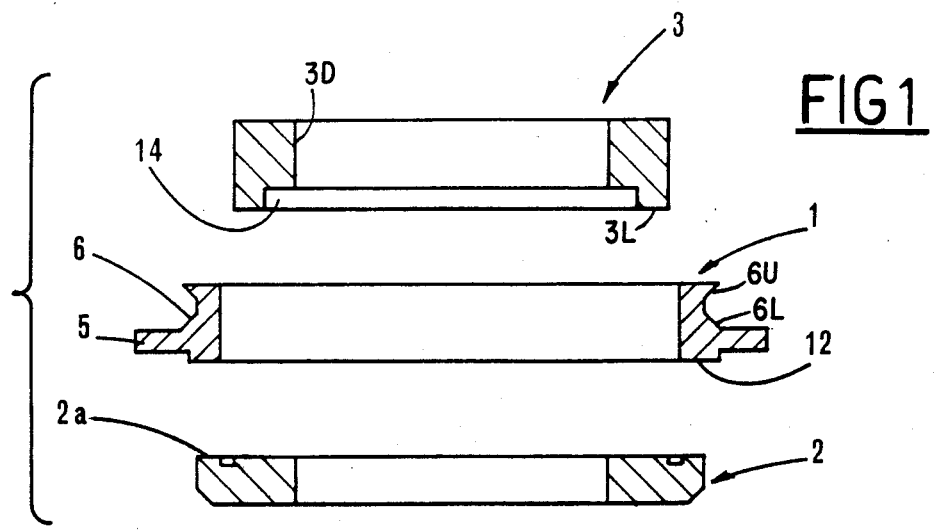
FIG. 1 is cross-sectional view exploded in the longitudinal direction of the sealing device.

Referring now to the drawings, the sealing device according to the present invention essentially comprises an inner (middle) ring 1, adjustable to provide a given clearance from a support shaft; an outer (lower) ring 2, also adjustable to provide shaft clearance, and which is adapted to contact along its upper face part of lower face, of the ring 1. An annular spacer 3 is adapted to be disposed within the ring 1 and compressed between the ring 2 and the toroidal member 4 (usually but not necessarily a bearing) to be protected upon assembly.

Figure 2:
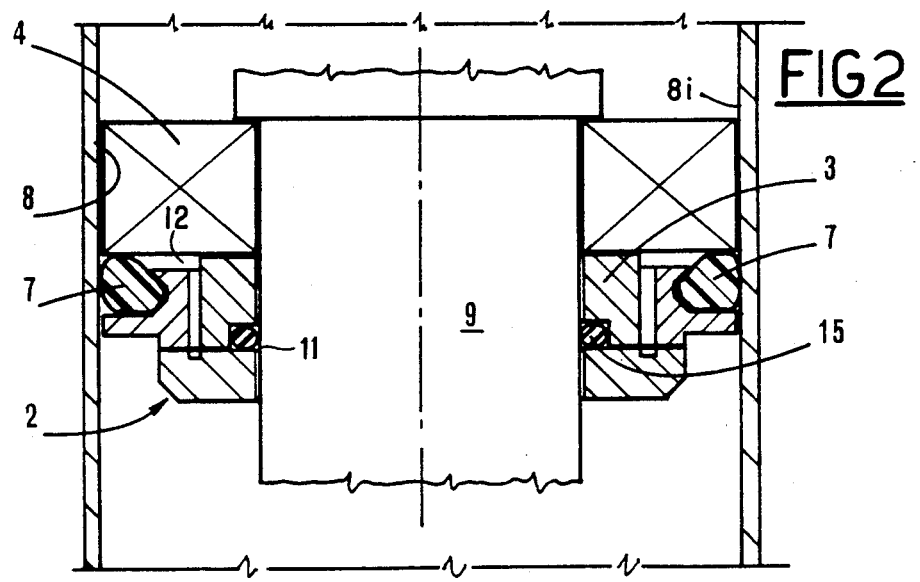
FIG. 2 is a partial sectional view of the entire device and protected member in an assembled configuration.

The middle ring 1 has a cylindrical flat inner surface and is provided outwardly with a peripheral annular lip 5 defining an annular groove 6. Groove 6 is provided with tapering sides 6U and 6L, is disposed adjacent the upper surface of the ring 1, next to said annular lip 5 which is the side aligned to oppose the bearing 4, when in its assembled position. The annular lip 5 and groove 6 define the channel that will at least partially accommodate a sealing member 7 (FIG. 2) composed of a resilient synthetic rubber, of the O-ring configuration.

When in its assembled position, seal 7 of the special cross section depicted, exerts a sealing action upon the outer edge of the toroidal bearing 4 and also on the inner surface 8i of the casing 8 within which the ring group itself is mounted.

The lower ring 2 has a thinner cylindrical form and its inner diameter is slightly greater than the external diameter of the shaft 9 on which said bearing 4 is to be fitted.

The upper face 2a of the lower ring 2 is adapted to lie partially against the opposing lower annular surface 12 of the middle ring 1. This support will be maintained by a fastening means, such as adjustment rings or nuts, located on the end portion of the shaft 9 and (not shown in the figures.)

The two surfaces, 2a and 12, suitably fabricated, are intended to sealingly slide one against the other.

Spacer 3 is of an uniform external cylindrical form with its inner diameter 3D being the same as the diameter of lower ring 2. On the lower face of spacer 3, adapted to lie against ring 2, the spacer 3 is provided with an inwardly disposed recess 14, defining an enlarged cylindrical counterbore. The recess 14 of the ring defines, when in mating association with the lower ring 2, an annular void 11, of square cross section, adapted to accommodate another seal 15 of the conventional O-ring type. Seal 15 has a markedly smaller cross-section than outer seal 7. When assembled, it is adapted to exert a sealing action upon the central shaft 9.

In addition, the axial height of the spacer 3 is somewhat greater than that of middle ring 1. This serves to define the rectangular void 12 seen in FIG. 3.

The mated elements, comprising the rings 1 and 2, and the spacer 3, together with their companion seals 7 and 15 define the device which is the subject of the present invention. It is capable of insuring a perfect sealing thus protecting the torodial member 4 from impurities infiltrations. The taught device has a remarkably smaller axial (vertical) thickness than traditional radially located seals made of steel. In actual fact, its size is not any larger than that of a conventional oil seal, so that the use of the invention does not require any modifications as to the dimensions of the rings or bearing 4. The smaller size also involves a better utilization of the features of the bearing 4 which, in this case, can then work in a less cantilevered condition.

Furthermore, it is to be noted that the device of the invention does not require Accessories for the lateral thrusts, and it also performs the function of a spacer. Rings 1 and 2 are preferably made of steel, type 100 or Cr 6 and the spacer 3 is made of steel, type C 43.

Advantageously, the adjacent surfaces 2a and 12 of the rings 2 and 1, respectively, are adapted to be in contact with each other, and are disposed to be partially overlapping.

Figure 3:
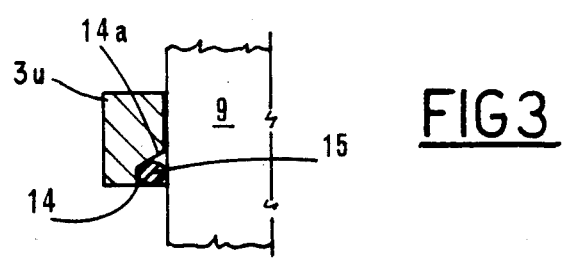
FIG. 3 shows a broken away portion of the device, according to an optional recess construction for one of the spacer elements.

In accord with another embodiment, the recess 14a partially defined by the modified recess of spacer 3a, that can be shaped as shown in FIG. 3. More particularly, it can have the upper wall 14a of the recess step 14 inclined inwardly so as to foster the pressure and therefore the snugness of the seal 15 upon the shaft 9. Generally, the seal materials of construction used can be of any type, and the shape and sizes of any nature and magnitude according to working requirements.

What I claim is:

1. A radially positioned sealing device for rotating members comprising: an middle rigid ring adjustable to a given clearance, and being peripherally provided with a shoulder, at least partially accommodating a first annular sealing means; an second adjacent rigid ring, adjustable to a given clearance, adapted to lie, along its upper face contact with the lower face of the middle ring; an annular rigid spacer adapted to be slipped within the middle ring and to be press fitted between the second ring and a rotating member to be protected and being provided with a recessed shoulder in its lower face adapted to provide an annular void serving to accommodate a second annular sealing means.

2. The device as claimed in claim 1, wherein said second ring is adjustable to a given clearnace, and both it and the spacer have their inner diameter slightly larger than the external diameter of the central shaft on which the ring group is mounted, thereby exerting a sealing action on said shaft, by the second seal accommodated within the spacer recess itself.

3. The device of claim 1 wherein the recess is provided with tapered sides converging towards a planar inner surface.

4. The device as claimed in claim 1, wherein the recess of the annular spacer for accommodating the second sealing means has at least one portion of its recess wall inclined with respect to the axis of the spacer so that it causes a thrust on the second seal, providing a bias towards the shaft on which the sealing device is mounted.

5. The device as claimed in claim 1 wherein said second ring and said spacer both have their inner diameters slightly larger than the diameter of the shaft on which the device has to be mounted, so that they are concentric to the same when in operation.

* * * * *